(12) United States Patent
Boyer et al.

(10) Patent No.: US 9,333,646 B2
(45) Date of Patent: May 10, 2016

(54) CONTROL SYSTEM FOR AND METHOD OF CONTROLLING PRODUCT DELIVERY SYSTEMS

(71) Applicant: FASTCORP 3, LLC, Chester, CT (US)

(72) Inventors: Jeff Boyer, Andover, NJ (US); Joseph Todd Piatnik, Bethel, CT (US); Fernando A. Ubidia, Ludlow, MA (US); Aaron M. Stein, Middletown, CT (US); John F. Lewis, Monson, MA (US)

(73) Assignee: FASTCORP 3, LLC, Chester, CT (US)

( * ) Notice: Subject to any disclaimer, the term of this patent is extended or adjusted under 35 U.S.C. 154(b) by 63 days.

(21) Appl. No.: 14/474,854

(22) Filed: Sep. 2, 2014

(65) Prior Publication Data

US 2015/0134106 A1 May 14, 2015

Related U.S. Application Data

(62) Division of application No. 12/954,823, filed on Nov. 26, 2010, now Pat. No. 8,825,193.

(60) Provisional application No. 61/264,318, filed on Nov. 25, 2009.

(51) Int. Cl.
| | |
|---|---|
| *G06F 7/00* | (2006.01) |
| *G06F 19/00* | (2011.01) |
| *G05B 19/04* | (2006.01) |
| *B25J 9/16* | (2006.01) |
| *B25J 9/04* | (2006.01) |
| *G07F 9/02* | (2006.01) |
| *G07F 11/10* | (2006.01) |
| *G07F 11/16* | (2006.01) |
| *G07F 11/24* | (2006.01) |
| *B25J 15/06* | (2006.01) |
| *B65G 1/04* | (2006.01) |

(52) U.S. Cl.
CPC .. *B25J 9/16* (2013.01); *B25J 9/042* (2013.01); *B25J 9/044* (2013.01); *B25J 9/1692* (2013.01); *B25J 15/0616* (2013.01); *B65G 1/04* (2013.01); *G07F 9/026* (2013.01); *G07F 11/10* (2013.01); *G07F 11/165* (2013.01); *G07F 11/24* (2013.01); *G05B 2219/39048* (2013.01)

(58) Field of Classification Search
None
See application file for complete search history.

(56) References Cited

U.S. PATENT DOCUMENTS

| | | | |
|---|---|---|---|
| 5,103,404 A | 4/1992 | McIntosh | |
| 5,240,139 A | 8/1993 | Chirnomas | |
| 5,326,218 A | 7/1994 | Fallas | |
| 5,502,944 A * | 4/1996 | Kraft | G07F 17/0092 221/2 |
| 6,547,096 B1 | 4/2003 | Chirnomas | |
| 7,044,330 B2 | 5/2006 | Chirnomas | |
| 2004/0123567 A1 | 7/2004 | McErlean et al. | |
| 2004/0129150 A1 | 7/2004 | Lancaster et al. | |
| 2007/0284384 A1 * | 12/2007 | Chirnomas | G07F 11/04 221/9 |
| 2008/0093371 A1 * | 4/2008 | Ubidia | B25J 9/041 221/1 |

(Continued)

FOREIGN PATENT DOCUMENTS

| | | |
|---|---|---|
| CN | 1444537 | 9/2003 |
| CN | 101079162 | 11/2007 |

(Continued)

*Primary Examiner* — Yolanda Cumbess
(74) *Attorney, Agent, or Firm* — Kutak Rock LLP; Bryan P. Stanley

(57) ABSTRACT

A control system for and methods of controlling a product delivery system are provided.

10 Claims, 1 Drawing Sheet

(56) References Cited

U.S. PATENT DOCUMENTS

2008/0127711 A1 6/2008 Farag
2008/0135574 A1 6/2008 Hieb et al.

FOREIGN PATENT DOCUMENTS

JP 2004524595 3/2002
WO 0219285 3/2002

* cited by examiner

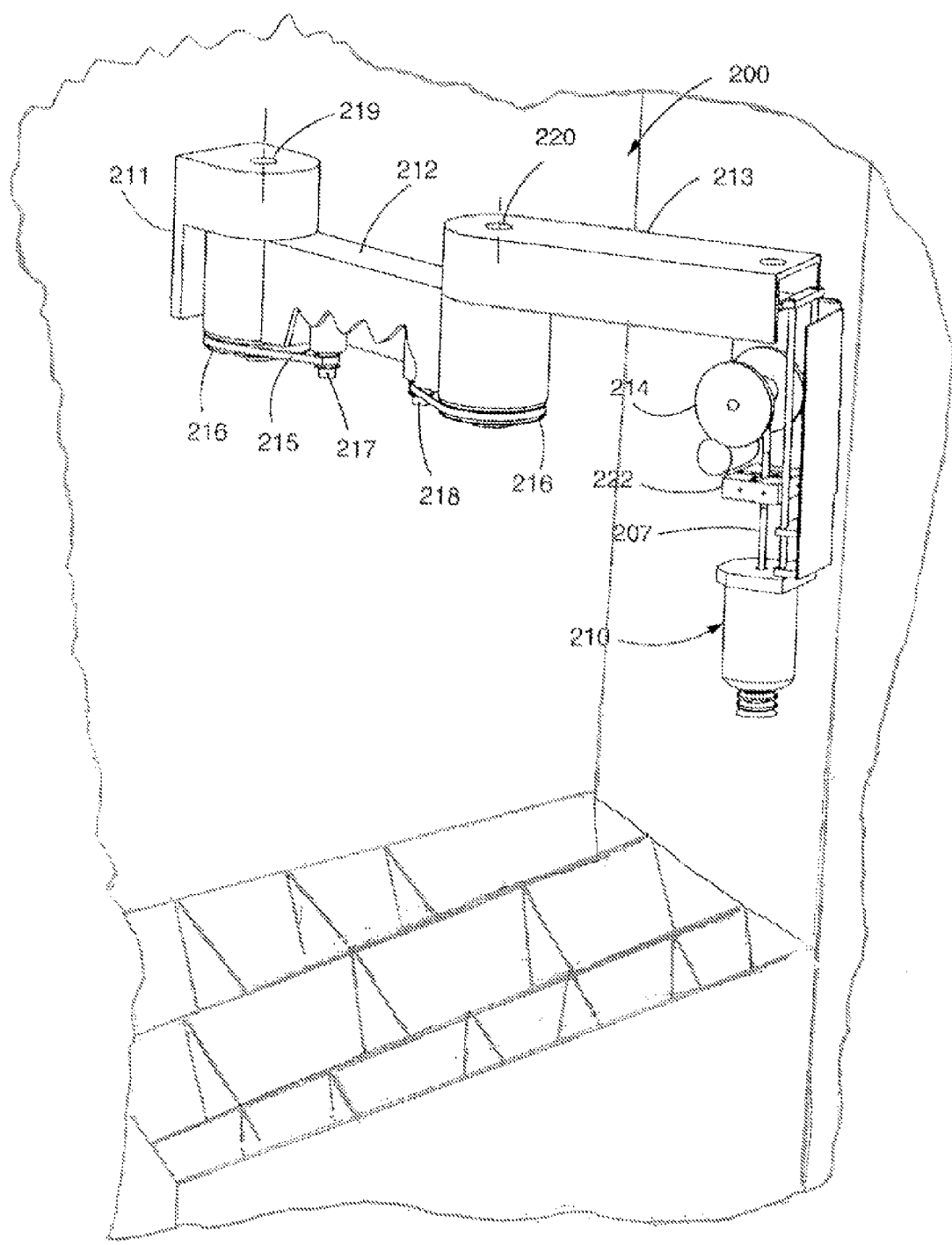

CONTROL SYSTEM FOR AND METHOD OF CONTROLLING PRODUCT DELIVERY SYSTEMS

CROSS-REFERENCE TO RELATED APPLICATIONS

This application is a divisional of U.S. patent application Ser. No. 12/954,823, now U.S. Pat. No. 8,825,193, which claims priority pursuant to 35 U.S.C. 119(e) to then U.S. Provisional Patent Application Ser. No. 61/264,318, filed Nov. 25, 2009, the entire disclosures of which are incorporated herein by reference.

FIELD OF THE INVENTION

The present invention relates generally to product delivery systems. More specifically, the present invention is concerned with product delivery systems such as vending machines and the like, and control systems and methods of controlling the same.

BACKGROUND OF THE INVENTION

The dispensing process for vending varies according to the application. For example, a common dispensing process for bottled and canned beverage vending machines has motors for rotating an oscillator that, depending on the position and angle of rotation, will dispense the container (can or bottle) when activated. In other bottle and can vending machines, a carriage is maneuvered horizontally and vertically to position the carriage in front of the bottle or can that is to be vended. The bottle or can is released so as to fall into the carriage, and the carriage is maneuvered to a drop port where the bottle or can is dropped into a dispensing area.

Frozen food vending can present certain challenges to dispensing because some of the components required to activate the dispensing mechanism are often enclosed within the freezer compartment, creating a harsh environment in which those components must operate. Alternatively, all components of the dispensing mechanism are segregated from the freezer compartment at all times except during a vend cycle. Vacuum systems, such as those disclosed in any of U.S. Pat. Nos. 7,044,330; 6,547,096; and 5,240,139, and U.S. Pub. No. 2008/0093371, the entire disclosures of which are incorporated herein by reference, have been used in frozen and non-frozen food dispensing environments to lift product from a bin and move the product to a drop port for dispensing. Such systems are particularly useful in connection with frozen environments, as the dispensing mechanism may typically be segregated from the freezer compartment at all times except during a vend cycle.

U.S. Pub. No. 2008/0093371 discloses a vacuum system that provides increased efficiency, is less complex and less cumbersome than vacuum systems of the prior art. The vacuum system disclosed in U.S. Pub. No. 2008/0093371 utilizes an articulated robot arm to position a self-contained motor driven rotary vacuum generating assembly so as to pick up a product to be vended from a storage bin, carry the product to a dispensing area and dispense the product. The vacuum system of U.S. Pub. No. 2008/0093371 includes various beneficial control system features over the prior art. For example, the control system monitors electrical current draw of the vacuum generating assembly to determine when a product has been grasped and when it is released by the vacuum. This aids the system in evaluating whether or not a product has actually been dispensed from the machine. In addition, the control system of U.S. Pub. No. 2008/0093371 monitors the rotational motion of the segments of the robot arm to precisely position the vacuum generating assembly during a vend cycle. Notwithstanding the improvements these features provide over the prior art, among other disadvantages, the control system of U.S. Pub. No. 2008/0093371 does not provide a simple means for calibrating, programming and/or re-programming the control system, and does not provide a means for reducing and/or monitoring vend failures. Therefore, it would be desirable to provide a control system that overcomes these, as well as other disadvantages of the prior art.

In a typical vending machine, products are added by a route driver (who works for a vending operator), filled (restocked) to par level (full) and that same route driver removes any cash that is in the machine based on purchases made since the last time the route driver restocked the machine. Data regarding the restocking process is often captured with a hand held recorder or a telemetry device transmitting the data back to a central server that is accessed by the machine owner/manager ("operator"). The trigger event for transmitting such data is typically opening and closing of the door actuated via an open and close switch within the machine.

This process has an inherent error factor. When the route driver closes the door, the system makes assumptions that the machine was filled to a par value, or filled to a level known to the machine to be full. The actual product level or actual product quantities in the machine after it is restocked by the route driver are not known and can be altered by the route driver prior to or after closing the door. This allows the route driver to "cheat" the system and steal product by making the inventory control system think the machine is full, but not restocking products to the par level. Therefore, it would be beneficial to provide a method and system that allows the machine operator to confirm the actual quantity of product that is filled into a machine each and every time it is restocked.

SUMMARY OF THE INVENTION

The present invention comprises improved product delivery systems, control systems for and methods of controlling product delivery systems, in vending machine applications and the like. The control system of the instant invention is part of a product delivery system that includes a positioning system, a product holding device, and a controller (control system) to control the product delivery process. Preferred embodiments of a product delivery system in which the control system of the instant invention may be incorporated are shown and described in U.S. Pub. No. 2008/0093371, the entire disclosure of which is incorporated herein by reference. Notwithstanding, it will be appreciated that the control system of the instant invention may be incorporated into various product delivery systems and/or vending machines now known or hereafter developed without departing from the spirit and scope of the instant invention (including, but not limited to, robotic positioning systems having articulated arms, Cartesian rail assemblies, or any other manner of positioning, as well as vacuum or non-vacuum holding/gripping devices).

In some preferred embodiments, the positioning system (referenced herein as a robotic manipulator), is a robotic linkage comprised of arm segments joined by rotational joints. Each rotational joint is driven by a drive system which rotates the adjoining arm segment relative to the other arm segments to provide several degrees of freedom to the robotic manipulator. In some preferred embodiments, the product holding device is a vacuum picker head and is joined at one extremity of the robotic manipulator. The opposite extremity of the robotic manipulator is fixed to a structural member within a cabinet of vending machine apparatus or the like by a suitable structure such as a rotational joint.

In some preferred embodiments, the vacuum picker head is a self-contained air vacuum pump assembly comprising a housing containing a vacuum pumping mechanism, a vacuum pump driving mechanism, such as a motor, and a suction cup. In some such embodiments, the vacuum picker head is sized and shaped to be capable of insertion and retraction from one or more bins within a vending machine.

In a preferred embodiment, the positioning system includes a cable and reel device to lower and raise the vacuum picker head with respect to the position of the robotic manipulator. The cable is spooled onto the reel to raise the vacuum picker head, and the cable may be unwound to lower the vacuum picker head. In one embodiment, the cable includes one or more conductors that transmit electrical power to the vacuum picker head and transmit control signals between the vacuum picker head and the controller. In another embodiment the cable is comprised of a generally inelastic material along its axial length. The use of an inelastic material increases accuracy of positioning of the picker head, in that as the cable is wound or unwound on the reel, the total length of the cable generally remains unchanged.

In preferred embodiments, the controller of the present invention controls the rotation of the robotic manipulator arm segments, the lowering and raising of the vacuum picker head, and the activation and deactivation of the vacuum pump contained within the vacuum picker head. The controller monitors the current draw of the vacuum pump to determine if a product is held by the vacuum pump while the vacuum pump is running. A detected increase in the current draw of the vacuum pump is utilized by the control system to determine that a vacuum is being generated, and therefore, that a product is held by the vacuum picker. The controller is capable of monitoring the current draw of the vacuum pump in conjunction with the rotational motion of each arm segment so as to determine the precise location and orientation of the vacuum pump when a product drop (or vend failure occurs). This enables the controller to attempt to adjust for, correct or otherwise overcome the cause of the vend failure. In preferred embodiments, the controller is also capable of increasing or decreasing the power delivered to the drive system of each arm segment in a coordinated manner and in conjunction with monitoring of the rotational motion of each arm segment to reduce vend cycle time and maximize vend success. In preferred embodiments, the controller utilizes the monitoring of current draw of the vacuum pump and/or the monitoring of the rotational motion of each arm segment of the robotic manipulator to aid in calibrating, programming and/or re-programming the control system.

In some preferred embodiments, a sensor for retro-reflective energy is mounted on the product holding/gripping device and operably connected to the controller. In some embodiments the sensor comprises an ultrasound transducer. The sensor for retro-reflective energy of the instant invention is mounted to the holding/gripping device to enable the sensor to sense the depth of product located within a product bin relative to a "home" position of the holding/gripping device located directly about the product bin. Upon closure of the door the controller of the instant invention senses such closure via an open/close switch operable connected to the controller, and the controller runs through the following control algorithm:

Upon sensing door closure, the controller indexes incrementally through each product bin location that has been pre-programmed into a database accessible by the controller (i.e. bin locations A1, A2, A3, B1, B2, B3, etc.). The controller moves the holding/gripping device directly above each of the pre-programmed bin locations at a predetermined height above such locations (the "home" position above each bin location). As the holding/gripping device reaches its position above a bin location, the retro-reflective sensor of the instant invention is utilized by the controller to read the height of product in that particular product bin (or the distance between the sensor/home and the top surface of product located within the bin). That value is saved by the controller in a table (database) for that particular bin.

Upon completion of the first bin product read, the controller indexes to the next pre-programmed position, repeats the process described above and then continues through each bin location until the height of product for all bins is read and recorded in the appropriate table.

As products are dispensed, the controller knows (i.e. records in a database and/or reports/transmits to the operator) exactly how many products have been dispensed over a period of time and each table is updated on a delivery of product (i.e. the actual quantity of product for each bin is stored in a database, and the controller reduces the quantity in a particular bin by 1 each time a product is vended from that bin, or, alternatively, the controller maintains a counter for each bin that counts the number of products vended from each bin between machine services).

When the route drive arrives for the next machine service, the controller knows (i.e. has stored in a database and/or reports/transmits to the operator) exactly how many products have been sold (from each bin and from the machine as a whole) and exactly how much cash has been taken by the machine since the last service; this is triggered by the door switch.

In the controller of a preferred embodiment there is a menu driven programming/set-up function. This programming function requires that upon installation or setup of a machine a technician (such as the operator or machine installer of the operator) define the bin location, price of product, selection number and bin height among other parameters. The programming function further requires that the technician define a "product depth" or "number of products" that are, or will/may be contained inside the bin when it is full (whether it is a tall bin or a short bin). By defining product "depth" or by defining the number of products that fit in a full bin, the controller uses the product sensor to read the difference in height from the home position in the machine to the depth (top surface) of the product in that bin and then calculate (utilizing bin height) how many products are in each bin, in total, when the door gets closed. This combination of a sensor and a control algorithm give the operator the assurance of product quantity each and every fill. It gives a closed loop system by providing exact product count at each visit upon door closure and leaves no opportunity to "cheat" the inventory system.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 1 is a partial perspective view of a vending machine that utilizes a control system and control methods of the instant invention in connection with vacuum picker robotic manipulator.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, a partial perspective view of a vending machine is shown. The vending machine includes a generally rectangular housing (or cabinet) having a top wall, bottom wall, side walls, and a rear wall that define an open interior cavity. A door functions as a removable (or partially removable) front wall for the interior cavity of the vending machine. Delivery system 200, which includes vacuum picker head assembly 210 coupled to a robotic manipulator, is attached to the rear wall of the vending machine via mount 211 within the interior cavity. The robotic manipulator of the delivery system 200 includes main arm segment 212 that links to mount 211 and pivots about rotational joint 219 to provide a range of yaw rotation. A second arm segment 213 is linked to the main arm segment and pivots about an additional rotational joint 220 to provide a yaw range of rotation independent of the main arm segment 212. In this manner, the robotic manipulator can extend into a long reach or fold back on itself to position the vacuum picker head 210 to any suitable position over the entire horizontal cross section of the interior cavity of the vending machine. The robotic manipulator also includes pulleys 216, belts 215, and motors 217, 218 to produce rotation of arm segments 212 and 213. The robotic manipulator further includes motor driven reel 214, on which cable 207 is spooled. Cable 207 extends through guide 222 and is attached at its end opposing reel 214 to picker 210. Cable 207 is unwound from reel 214 to lower vacuum picker head 210 into a bin, or other contact point, located within the interior cavity of the vending machine. Picker head 210 is sized and shaped to be capable of being lowered down to the bottom of each bin so as to pick up products that are located within the bins.

The control system and control methods of the instant invention shall be described herein in connection with the vending machine shown in FIG. 1, which includes a plurality of bins of various dimension located below delivery system 200 within the interior cavity of the vending machine. Notwithstanding, it will be appreciated the system and methods of the instant invention may be used in connection with a delivery system for any suitable vending machine and may include any of a multitude of vending machine enclosure sizes, styles, and configurations. Further, it will be appreciated that alternate delivery systems (including, but not limited to vacuum or non-vacuum picker heads, and articulated arm or Cartesian robots) may be utilized and that the delivery system may be used to move any suitable product, including but not limited to, refrigerated food product, frozen food product, non-refrigerated food product, and product without packaging or in any suitable packaging such as, but not limited to, bags, boxes, etc. It will also be appreciated that the system and methods of the instant invention may also have broader application outside of vending machine applications. For example, the delivery system may have broader industrial use in applications such as, but not limited to, assembly operations. It will further be appreciated that the delivery system may be utilized in any suitable application. Furthermore, the delivery system may utilize any suitable number of robotic manipulators, manipulator arm segments, and/or any suitable number of picker heads, or any combinations thereof. Further, it will be appreciated that the control system of the instant invention may be configured to provide fully automatic vending so that the picker head and robotic manipulator complete the vending cycle without any customer feedback, or the delivery system may be configured to be manually operated fully or in part by the customer or user (i.e. for programming, repairs, or amusement purposes).

In a preferred embodiment, the control system includes a microprocessor, or other suitable computer processor, for performing various operations as defined in the firmware/software programming of the logic of the control system. The microprocessor includes, or is otherwise connected to one or more storage media, including but not limited to ROM, RAM, magnetic disk drives, etc., in which firmware for, software for and/or data collected or generated by the control system is utilized, accessed and/or stored. The microprocessor is connected to and/or controls all operational functions/components of the vending machine, including but not limited to: movement/braking/calibration/control of the delivery system; automated opening/closing of product storage areas (such as a freezer lid in a frozen vending machine); input/product selection decisions by users/purchasers via a user interface (keyboard, etc.); input from machine operators (i.e. the person that stocks products and maintains the machine) via a user interface (keyboard, etc.); verification/collection/refund of payment via a payment mechanism (i.e. coin/token mechanism, bill/coupon acceptor, credit card reader, etc.); collection, storage and reporting (such as via a user interface on the machine, or alternatively via communication of data to a separate computer or access device through telemetry such as WiFi, phone line, cable, WAN, LAN, or the like) of data regarding machine inventory, usage, malfunctions, etc.; and user programmed bin arrangements and product information.

The control system for the vending machine shown in FIG. 1 controls power delivered to motors 217 and 218 and motor driven reel 214 during vend cycles, programming, testing, demonstrations, diagnostics, setup/configurations, and any other time in which the robotic manipulator is to be manipulated. During a vend cycle, the control system powers motors 217, 218 and 214 to position picker head to pick up products from within the bins, remove the product from the bins, carry the product to a dispensing port located in the door of the vending machine and release the product to dispense through the dispensing port. The control system also controls the power delivered to a vacuum motor within picker head 210, and in a preferred embodiment, includes a feature for ramping up and down the power supplied to the vacuum pump of the vacuum picker (i.e. ramping the power up during activation of the vacuum pump and ramping power down during deactivation of the vacuum picker) to help minimize undesirable rotational movement of the vacuum picker head. The control system obtains and utilizes positional feedback of the rotational motion of the robotic manipulator arm segments and picker head (i.e. through magnetic rotary encoders, or other suitable sensors associated with the arm segments and picker head and connected to the microprocessor controller) to precisely position the arm segments and/or picker head as needed or desired. The control system also monitors the electrical current drawn by the vacuum pump motor (i.e. through an amp meter or other suitable sensor associated with the motor and connected to the microprocessor controller), which will increase when suction is created by a product being held by the vacuum picker head. Upon detection of the drawn current increase, a condition is satisfied in the logic sequence of the controller, which indicates that a product is being held by the vacuum picker.

The control system of the instant invention simultaneously monitors the current draw of the vacuum pump and the rotational motion of each arm segment and of the reel of the robotic manipulator. The control logic of the control system determines if a product drop occurs and at the same time determines the location and/or orientation of the components of the delivery system at the instant the drop occurs, stores data regarding the location and orientation of the components at the time of the product drop in a storage medium accessible by the controller and utilizes said data to attempt to adjust for, correct or otherwise overcome the cause of the vend failure.

In the preferred embodiment, the controller of the instant invention is connected to rotary encoders such as the AS5040 10-Bit programmable magnetic rotary encoder offered by Austria Micro Systems at www.autriamicrosystems.com. A first rotary encoder is associated with rotational joint 219 to provide a numerical value to the controller's processor representative of the angular orientation of arm segment 212 with respect to mount 211. A second rotary encoder is associated with rotational joint 220 to provide a numerical value to the controller's processor representative of the angular orientation of arm segment 213 with respect to arm segment 212. In a preferred embodiment, a third encoder (rotary, or alternatively a linear pulse encoder) is associated with motor driven reel 214 (or cable 207 or picker head 210) to provide data to the controller processor representative of the height of the picker head with respect to arm segment 213.

In order for the controller to determine the actual location within the cavity or cabinet of the vending machine of each component for which encoder data is obtained, the system must first be calibrated. The system of a preferred embodiment of the instant invention is calibrated by positioning the robotic manipulator at a calibration point within the cabinet and recording the numerical data for each encoder at that location and assigning those numerical values as "zero values" (in a database or other storage location accessible by the control system) for later usage in control sequences. This allows the robotic manipulator to be quickly and easily calibrated to the cabinet of the machine either during initial construction of a new machine, during replacement of the robotic manipulator in an existing machine, or for recalibration in an existing machine.

Each encoder, which is mounted at various locations on or in association with the moving parts of the robotic manipulator (as is discussed above) is assigned a unique electronic encoder serial number. This serial number for each encoder is stored in a database (or other storage location) for access by the control system. The control system designates a specific storage location (for example a specific database cell) for each encoder based upon the specific input location of the control system to which that encoder is connected. Whenever the control system of the vending machine boots up, the control system obtains the unique serial number from each encoder that is connected to the control system and verifies that the serial number has been stored and that a "zero value" is also stored for that encoder in the appropriate storage location. If the robotic manipulator is being installed in a new machine, or is a replacement for an existing machine, such that no encoder serial numbers or different serial numbers are recognized during boot, the control system enters a calibration mode. In the calibration mode, a display screen connected to the control system (such as an LCD screen on the front of the machine that is part of the purchaser selection/input device, or alternatively a screen that is part of a separate input and/or output device that is located within the machine cabinet or alternatively which may be connected to the machine via wired or wireless connection by a machine operator/technician) displays a message or code that instructs the machine operator/technician to calibrate the machine. The operator/technician moves the robotic manipulator (either manually by physically pushing the arm, or remotely by utilizing an input device such as a joystick or keypad to the control the movement of the arm) to the calibration point located in the cabinet of the vending machine. The calibration point is a fixed, constant and known location in the machine. For example, in the machine shown in FIG. 1, the calibration point for arm rotational joints 219 and 220 is at the rear of the machine with the both arm segments 212 and 213 at their limit points of physical travel within the cabinet. When the robotic manipulator is positioned at the calibration point in the machine, the operator/technician verifies through the input device to the control system that the robotic manipulator is ready to be calibrated. The control system then obtains the numerical position value from each encoder and records those values as zero values for later use during operation of the robotic manipulator. The control system also records the serial number for each encoder for subsequent calibration verification.

During calibration (or recalibration), the control system of the instant invention checks one or more databases (or other storage location) in which encoder numerical values for one or more product pickup or product drop locations may be stored. The product pickup (or drop) locations may be pre-configured planograms that are programmed into the control system firmware or software during manufacture of the machine, or may be custom pickup (or drop) locations that have been programmed after manufacture by a machine operator/technician. In the machine shown in FIG. 1, the pickup (or drop) locations may be bin locations including the location along the x (left and right directions in a vending machine) and y (front and back directions in a vending machine) axes of the vending machine, or may be arbitrary locations without the use of any bins. In a preferred embodiment of the machine shown in FIG. 1, pickup location data also includes data regarding the maximum depth of the machine cabinet at a specific x and y location, as well as the expected depth in which product is located (i.e. if the bin is full, the expected depth of product would be the z location of at the top of the bin). If product pickup (or drop) location values have been stored, the control system calculates an offset factor to update the product pickup (or drop) location values. The offset factor is calculated by obtaining the differences between the numerical encoder zero values that were previously stored and the new numerical encoder zero values for each respective encoder. This difference (offset factor) is then applied to the product pickup (or drop) location values and the new product pickup (or drop) location values are stored for use during vending and other related operations of the machine.

In a preferred embodiment, prior to exiting the calibration mode, the control system displays a message to the operator/technician to allow the operator/technician to verify all product pickup (or drop) locations. The operator/technician enters a required/requested input to initiate verification and the robotic manipulator beings the verification process. The control system powers the appropriate motors to move the manipulator to each programmed product pickup (or drop) location. In a preferred embodiment of the machine shown in FIG. 1, the control system moves the robotic manipulator to the x and y locations, and then gives the operator/technician the ability to move the picker head down to (i.e. to either a maximum depth, or some other desired depth) by initiation a specific input (such as pressing a specified button) of the control system. The control system then displays a message requesting that the operator/technician input a verification to confirm the pickup (or drop) location is correct, or otherwise move (through use of the input device or manually) the robotic manipulator into the correct position and then confirm that position. If the operator/technician moves the robotic manipulator to a different position prior to confirming, the control system obtains the numerical location values for that new position from the encoders and records those values in place of the previously stored position values. The control system continues with the verification process for each product pickup (or drop) location until all locations have been confirmed, or until the operator/technician inputs a code that discontinues the confirmation protocol.

In several embodiments of the instant invention, the control system includes a product pickup (or drop) location programming mode, that allows an operator/technician to program arbitrary bin or other product pickup or drop locations in association with specified user/purchaser inputs (or other desired/programmed indicators—i.e. certain drop location is associated with specified pickup locations) during a vend cycle of the machine shown in FIG. 1. In one such embodiment, the operator/technician can select to allow the robotic manipulator to "free wheel". In this embodiment, if the operator/technician chooses to free wheel, the control system disengages any brakes or motor brakes, or otherwise activates appropriate clutches or other release mechanisms that allow arm segments 212 and 213 to be manually positioned by the operator/technician with minimal frictional or other resistance. In this mode, once the operator/technician has positioned the manipulator at the desired location, the operator/technician enters an appropriate input command to the control system to set the location. The control system records the numerical location values for the applicable encoders and displays a message or code to the operator/technician to input the desired association with the location. If the location is a product pickup location, an exemplary association is for the operator/technician to input the user/purchaser input (such as a specific button or combination of letter and/or number keys depressed by the user via the user input device on the front of the machine) that is required to initiate a vend cycle for the product that is stored in that location in the vending machine. Once the operator/technician inputs the desired association, the control system stores that association along with (or in association with) the specified location values for later usage by the control system during operation. In another embodiment, or in the above-described embodiment but in which the operator/technician does not desire to utilize the free wheel feature, the operator/technician manipulates the movement of the robotic manipulator using an input device (such as by depressing arrow buttons on a keyboard, in which each depression represents an incremental movement in a certain direction) to the control system to power the appropriate motor or motors.

In a preferred embodiment, the control system of the instant invention utilizes a closed feedback loop to continuously obtain and update the numerical location values from the encoders, calculate rotational and/or linear speed of travel of the various components (or portions thereof) of the robotic manipulator, and to adjust the power accordingly to each motor during movement from one location to another location. In another preferred embodiment, the control system simultaneously monitors whether a product is or is not being gripped or held, and/or is dropped, and records numerical location data regarding where a product is first gripped and where a product is dropped.

In operation, when a purchaser inputs a product selection via the input buttons on the front of the machine of FIG. 1, after verifying that payment has been provided (or is otherwise not necessary, such as in a free vend, coupon or promotional mode), the control system obtains the numerical values from the encoders to determine the current location of the robotic manipulator, and accesses the stored numerical values regarding the location of the pickup location(s) that is associated with the purchaser's selection input. The control system then determines a general path of travel from the current location to the pickup location, moves the robotic manipulator to the pickup location, picks up the product, determines a general path of travel from the pickup location to the product delivery location (i.e. delivery/drop port or chute in the door of the vending machine), moves the robotic manipulator to the delivery location, and releases the product at the delivery location to complete the vend cycle. In a preferred embodiment, the general path of travel includes one or more intermediate points between the current location and the pickup location (or drop location) to which the robotic manipulator first travels before reaching its intended destination. In a preferred embodiment, intermediate locations are either pre-programmed, or otherwise calculated by the control system based upon known obstacle locations within the vending machine cabinet, such as a gusset or light bulb within the cabinet.

Typically, the points of travel of the robotic manipulator in FIG. 1 during vending operation are from: 1) the delivery location to an intermediate point; 2) from the intermediate point to a product pickup location; 3) from the product pickup location (with product held) to an intermediate point (which may be the same or may be a different location as the intermediate point from step 2 above); 4) from the intermediate point in step 3 to the product delivery location. Nevertheless, it will be appreciated that alternative or additional points of travel may be utilized without departing from the spirit and scope of the instant invention. For example, during periods of inactivity of the vending machine, the control system may move the robotic manipulator to a storage location (for example, to the calibration point in the cabinet). In one embodiment of the robotic manipulator shown in FIG. 1, the following logic steps are performed by the control system for each point of travel:

1. Calculate the distance (in rotary encoder ticks) each "joint" (shoulder or elbow) needs to travel.
2. Calculate a maximum speed for each joint. The joint that needs to travel further is assigned a higher maximum speed to try to get both joints to arrive at their destinations close to each other in time.
3. Start the motors associated with both joints at the same time at a low power setting.

In parallel for each joint:
4. While the joint is more than 45 degrees from its target:
   If speed is less than maximum—slightly increase power to joint
   If speed is more than maximum—slightly decrease power
5. When the joint is less than 45 degrees from target:
   Maximum speed is fixed to about 30 degrees per second. Preferably, the target speed without product is slightly higher than the target speed with product, to reduce product drops (vend failures).
6. Continue speed control as described in (4) and (5) above until the joint is within 1 degree of target destination for that joint.
7. Set the motor for that joint to coast.
8. If the control system obtains multiple readings over a period of about $\frac{1}{10}$ second that a joint is within 1 degree of target—apply brakes.
9. If with the brakes on the readings by the control system stay within 1 degree of target for $\frac{1}{10}$ second—this joint has arrived.
10. If the joint drifts off target—attempt a predetermined times to move back to proper position. In some embodiments, the control system utilizes a reduced speed (i.e. significantly lower speed than the calculated maximum for the joint) to attempt to move the joint back into proper position.
11. When both joints have been in brake mode at the same time for the correct amount of time the movement is complete.

In a preferred embodiment, during the above-described logic sequence, the position sensors (i.e. encoders) are read by the control system 40 times per second and speed/power is adjusted 10 times per second. In another preferred embodiment, the speed of movements and the rate of power adjustments are set lower by the control system when a product is being held than when no product is being held (i.e. when the robotic manipulator is moving to a pickup location to pick up a product). In another preferred embodiment, the controller increases or decreases the power delivered to the drive system of each arm segment and/or motor driven reel in a coordinated manner and in conjunction with monitoring of the rotational motion of each arm segment to reduce vend cycle time and maximize vend success.

As is discussed above, in operation, the control system utilizes the reading from the angular sensors (i.e. encoders) to position arm above desired product, then the control system initiates power to the vacuum system. Preferably, the control system ramps up power gradually to close to full power for the vacuum motor as the vacuum gripper head assembly is lowered toward the product to be picked up. As is discussed above, the control system monitors the current to determine if a product is picked up by the gripper. This is accomplished by first measuring the current to the vacuum when the vacuum is at full power but at a location in which the control system knows no product is being grasped or in contact with the tip of the picker head (such as a depth value stored for access by the control system that is at a height above the top of any bins) and utilizes that value to calculate the increase in current that the control system would expects to measure when an object is grasped by the vacuum. The control system then controls the reel motor to move the vacuum toward product and monitors the current until a change in current in the order of that calculated is measured.

In a preferred embodiment, information regarding the height of product located in a particular product pickup location is stored in a database (or other suitable storage location) accessible by the control system. In one such embodiment, a maximum stack height is preprogrammed into the control system, and when an operator/technician opens the machine and inputs a restock code into the machine, the control system defaults or assumes that the product is filled to the maximum height. In another embodiment, the actual product height (product depth) information for each bin is determined using a retro-reflective energy sensor and recorded in a database accessible by the control system. In some embodiments, height information regarding the type of product and/or quantity information is input and stored for access by the control system, so that the control system can calculate the expected height of the next product after a product is removed from the top of a pickup location. The calculated expected height is stored in a database (or other suitable location) for access by the control system during a vend cycle. In another preferred embodiment, the control system records and stores the height in which the picker head is located when the increase in current to the vacuum is measured as discussed above and uses this value as the approximate expected height of product for that pickup location during a subsequent vend.

In the embodiments discussed above, in which the control system accesses a database of expected product height, the control system causes the picker head to travel downward at a relatively fast rate of speed until it approaches the height in which product is expected, at which point the rate of decent is decreased. In the event an expected product height is not stored, the control system lowers the picker head at the slower rate of decent to avoid any malfunctions.

The control system continues to move the picker head down until the expected change in current draw for the vacuum is measured. At that point the control system stops the decent of the picker head, holds at that height for 1 second (or some other suitable period of time to allow the vacuum grip to fully engage), and then reverses the reel motor to raise the gripper back up and out of the bin. As the control system is moving the gripper up, the control system continues to monitor/measure the current draw. If the current draw suddenly decreases (such as by a predetermined or calculated expected percentage or amount), the control system recognizes this as a drop and records the location (height, z, as well as x and y coordinates, or angular equivalents thereto) in which the drop occurs in a database accessible by the control system. In one embodiment, the control system also records in the database information regarding the path of travel (including, but not necessarily limited to the pickup and drop locations for which the drop occurred).

By knowing the location in which a product drop occurred, the control system utilizes that location information to adjust the path in which the arm travels to attempt to vend the product again and avoid another failure. For example, if the product is dropped while the vacuum picker head is still within a bin, the x and y location of the picker head is slightly adjusted to attempt to better center the picker head within the bin. The control system of the instant invention utilizes the same parameters or measurements each time (i.e. location and motor current draw), and makes a predetermined number of attempts to vend the selected product, changing it path of travel or some other parameter each attempt. As another example of a parameter change, if the control system measures a failure to grasp a product (i.e. current increases when vacuum is lowered to product but then immediately decreases when vacuum starts to raise), the control system will raise the picker head out of the bin, turn off the vacuum and then restart the vacuum and then lower down to again attempt to grasp the product. As another example, if the product has already been raised out of the bin at the point in which the product drops, the control system picks up another product and utilizes a different path of travel to bring that product to the delivery port. As another example, multiple bins may be "chained" together, such that the data accessed by the control system indicates that a single purchaser input is associated with more than one product pickup location. As such, if a vend failure occurs from one bin, the control system will attempt to vend the product from another bin.

In a preferred embodiment, if a predetermined number of vend attempts all result in a vend failure, the purchaser is offered a refund or otherwise requested to make an alternate selection In a preferred embodiment, the control system records and stores in a database (or other suitable location) data regarding all vend failures. In situations in which bins are chained together, upon one or more (whatever number is programmed) vend failures from a specific bin, the control system records a problem code in connection with that bin. Also, an empty bin code is recorded when the control system determines (i.e. based upon number of products vended from the bin, or based upon last vend height, etc.) that a bin is empty. All data or problem codes regarding vend failures can then be reviewed by a system operator through a display device. In a preferred embodiment, the control system displays problem codes when an operator enters a service or load mode of the control system. In a preferred embodiment, all trouble codes are cleared from memory automatically when the operator exits the service or load mode as the control system assumes all troubles are fixed.

In a preferred embodiment, the control system records data regarding all current draw measurements obtained regarding the vacuum motor at instances in which the control system knows or assumes no product is being grasped (i.e. before the vacuum is lowered down into contact with a product). The control system profiles this data and periodically and dynamically makes adjustments to accommodate for certain anticipated problems. For example, as the vacuum motor gets warmer it becomes more efficient and also draws more current. If the current rises above a specified absolute value the control system will shut down the vacuum motor because it is assumed that the motor is getting too hot. In a preferred embodiment, the shut down is user friendly for period of time to allow the motor to cool down and includes a message to purchasers that says "please wait", "calibrating", or the like. In some embodiments, the control system also monitors temperature exterior to the motor being monitored (i.e. temperature within the vending machine cabinet, and utilizes such information to calculate the period of time in which the motor is allowed to cool. In other embodiments, the control system may activate a fan or other cooling device to aid in cooling the motor.

One example of the operation of the vending machine illustrated in FIG. 1 is particularly applicable to frozen product dispensing where the product is commonly stored within a chest such as a freezer, which includes a lid, and wherein different products bins are matrixed in a side-to-side and front-to-back layout within the chest freezer, and within each bin a product type is stored in a vertically oriented manner. In this example, the delivery system is located above the product bin. The system operates as follows: from a starting position, by means of the controller, the robotic manipulator arm segments are rotated about the rotational joints to position the vacuum picker head above the desired product storage bin. The controller determines if the freezer lid is open or closed. If the lid is closed, the controller activates a motor associated with a lid opener/closer device. The controller activates the vacuum pump and unwinds the reel to thereby extend the cable and lower the vacuum picker head into the bin within the freezer. The suction cup of the vacuum picker head contacts the product and a suction force is created to hold the product. The controller detects a change in the current draw of the vacuum pump, and thus, satisfies the condition that the product is held. The controller then spools the reel to thereby retracts the cable and raise the vacuum picker head from the bin. The controller repositions the robotic manipulator arm segments so that the vacuum picker head is positioned at or above the dispensing port. The controller then unwinds the reel to extend the cable and lower the vacuum picker head into the dispensing port. The controller cuts the power to the vacuum pump to release the product such that the product is dropped into the dispensing port. The controller then spools the reel to retract the cable and raise the vacuum picker head. The robotic manipulator may then be relocated to its starting position or some other suitable position and activates the motor to close the lid of the freezer. In situations in which multiple vending cycles are to occur simultaneously, or nearly simultaneously, the control system may be programmed to leave the lid of the freezer open and to proceed directly from the delivery port to the next bin location for the next product vend cycle.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A product delivery system for delivering product from a storage area to a dispensing area, the product delivery system comprising:
   a product holding device for selective coupling with the product;
   a robotic arm positioning structure coupled to the product holding device for moving the product holding device; and
   a control system for controlling the product holding device and the positioning structure;
   wherein the control system monitors whether the product holding device has coupled to a product and when a product has been released;
   wherein the control system comprises a closed loop feedback monitoring feature for rotational orientation of the positioning structure to provide precise rotational orientation positioning of the positioning structure;
   and wherein the control system includes a data log for recording the precise rotational orientation positioning of the positioning structure when a product is unintentionally released.

2. The product delivery system as claimed in claim 1 wherein said product holding device includes a self-contained motor driven rotary vacuum generating assembly, and wherein said product holding device is elongated and compact for precise selective picking up of the product from within a bin in which the product is located.

3. The product delivery system as claimed in claim 2 wherein said control system monitors an electrical current draw of the vacuum generating assembly to determine when the product holding device has coupled to a product and when a product has been released.

4. The product delivery system as claimed in claim 1 wherein the control system increases or decreases the power delivered to a drive system of each of multiple arm segments and/or a motor driven reel of said robotic arm positioning structure in a coordinated manner and in conjunction with monitoring of the rotational motion of each arm segment to reduce vend cycle time and maximize vend success.

5. The product delivery system as claimed in claim 1 wherein the control system utilizes the monitoring of current draw of the product holding device and/or the monitoring of the rotational motion of each of multiple arm segments of the said robotic arm positioning structure to aid in calibrating, programming and/or re-programming the control system.

6. The product delivery system as claimed in claim 5 wherein said programming includes programming of custom product pick up locations.

7. A method of delivering a product from a storage area to a dispensing area comprising:
   providing a product holding device, the product holding device being elongated and compact for precise selective picking of the product;
   providing a self-contained motor driven rotary vacuum generator carried by the product holding device;
   utilizing the product holding device on a robotic arm positioning system to transport the product; and
   recording in a data log the precise rotational orientation positioning of the positioning structure when a product is unintentionally released.

8. A vending machine for dispensing a product to a consumer, the vending machine having a storage area and a dispensing area, the vending machine comprising:
   a product holding device for coupling with the product to move the product from the storage area to the dispensing area, the product holding device having a self-contained motor driven rotary vacuum generating assembly attached thereto, and the product holding device being elongated and compact for precise selective picking of the product;
   a robotic arm positioning structure coupled to the product holding device for moving the product holding device; and
   a control system that includes a data log for recording the precise rotational orientation positioning of the positioning structure when a product is unintentionally released.

9. A product delivery system for delivering product from a storage area to a dispensing area, the product delivery system comprising:
   a product holding device for selective coupling with the product;
   wherein the product holding device includes a vacuum picker head assembly;
   a robotic arm positioning structure coupled to the product holding device for moving the product holding device;
   a control system for controlling the product holding device and the positioning structure; and
   a sensor for retro-reflective energy attached to said product holding device wherein the sensor is operable to detect a height position of the product in the storage area.

10. The product delivery system as claimed in claim 9 wherein said control system moves the product holding device directly above each of multiple pre-programmed bin locations at a predetermined height above such locations and activates said retro-reflective sensor to measure a height of product in each bin.

\* \* \* \* \*